Figure 1:
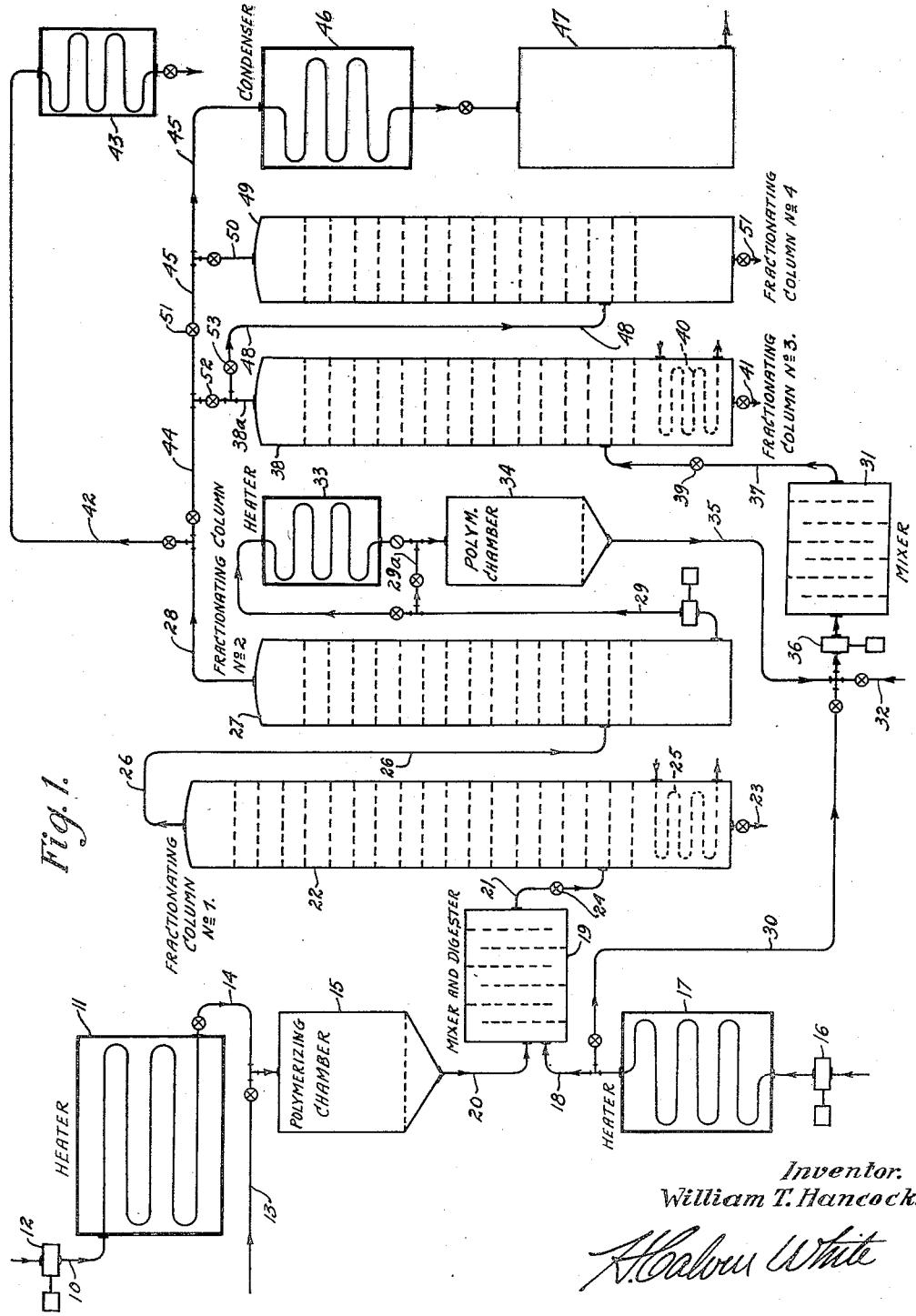

Patented Dec. 17, 1940

2,225,172

UNITED STATES PATENT OFFICE 2,225,172

REFINING PRESSURE DISTILLATE

William T. Hancock, Long Beach, Calif.

Application January 14, 1939, Serial No. 250,985

11 Claims. (Cl. 196—147)

This invention has to do with the treatment of cracked petroleum distillate by methods of the general type disclosed in my copending application Serial No. 161,954, filed September 1, 1937, on Process for refining cracked petroleum distillate, and has for its primary object to provide certain improvements whereby it is possible to increase substantially the percentage of sulphur removal from the gasoline content of the pressure distillate.

In accordance with the general method used in the present system, as well as that described in my copending application referred to above, pressure distillate containing a gasoline fraction is first subjected to polymerization and then admixed with a heated heavier oil, such as fuel oil or crude oil, containing hydrocarbons having a substantially higher boiling range than the gasoline fraction contained in the pressure distillate. As more fully explained in my earlier application, polymerization of the pressure distillate has the general effect of placing gum-forming and sulphur containing compounds in a condition whereby they are removable in the heavier oil by virtue of its solvent action and affinity for such compounds. After the pressure distillate is intimately admixed with the heated heavier oil, the gasoline fraction is distilled off, leaving the gum-forming and sulphur containing bodies to be removed from the system in the heavier oil. Among the outstanding advantages of the method are that it produces a final distillate unusually low in gums and sulphur and of stable water white color, without necessitating acid treatment, and the adaptability of the system for blending straight run and cracked distillate by using, as a heavier oil, a crude oil containing gasoline.

As previously indicated, my present principal object is to provide certain improvements whereby it is possible to remove a substantially higher percentage of sulphur compounds from the gasoline fraction of the pressure distillate. It has been found by fractional distillation of the polymerized pressure distillate gasoline, and sulphur analyses of the individual fractions, that the sulphur content increases as the gravities or boiling temperatures of the fractions increase. Analysis of 20% fractions shows the sulphur content to increase from 0.80% in the lightest, or lowest boiling fraction, to 1.45% in the heaviest or highest boiling fraction. Tests also indicate that the sulphur content of individual fractions increases disproportionately as their gravities increase; that is, the relative increase of sulphur percentage is greater as the gravities of the fractions increase.

I have found that the ultimate sulphur reduction in the pressure distillate can be further decreased to unusually low values by an improvement in the type of process of my co-pending application referred to above, whereby after initial polymerization and solvent oil treatment of the pressure distillate, the latter is fractionated to separate one or more heavy fractions, the sulphur content of which may be relatively high as compared with the sulphur content of the lighter fractions. The heavy fraction or fractions then are re-polymerized, admixed with the heavy solvent oil and distilled therefrom, further depleted of their sulphur content. The treated vaporized heavier fractions then may be combined and finally condensed with the lighter fractions, or the retreated heavier and once treated lighter fractions may be condensed separately and then combined or finally handled in any desired manner. In this way I am able, by retreating the heavier and higher sulphur-containing portion of the pressure distillate gasoline fraction, to obtain a final gasoline product of low sulphur content.

Figure 2:
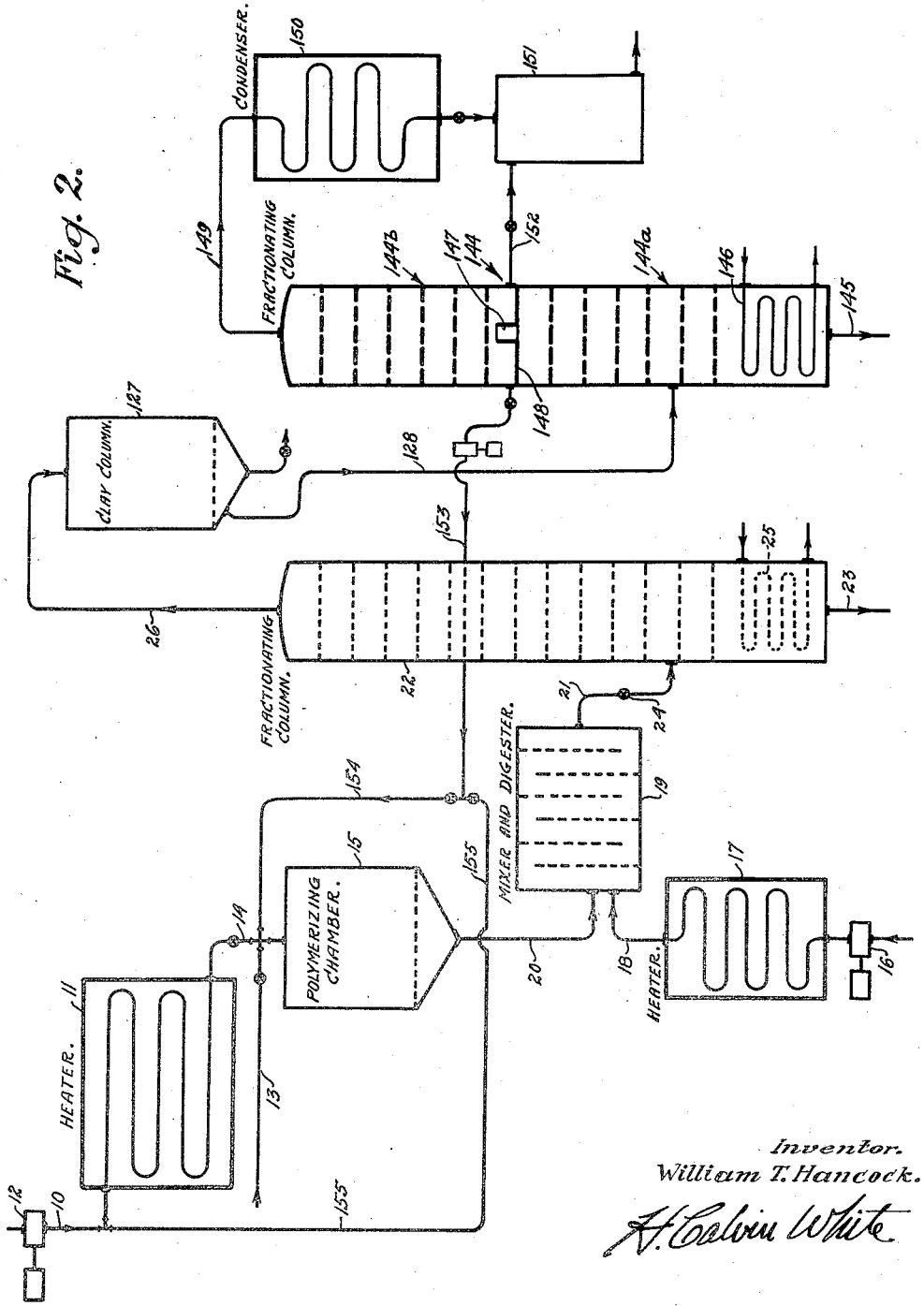

The invention will be understood to better advantage without necessity for further preliminary discussion, from the following description of treating systems illustrative of the invention in certain typical forms. Throughout the description reference is had to the accompanying drawings in which:

Fig. 1 illustrates diagrammatically and in flow sheet form a preferred system embodying the invention; and Fig. 2 illustrates a variational form of the invention.

Referring first to the system shown in Fig. 1, the pressure distillate to be treated may be derived from any suitable source, for example, from storage through line 10 leading to the heater 11 through which the distillate is forced by pump 12 and heated to a suitable polymerizing temperature, which will ordinarily range above 200° F., to temperatures around 350° F. to 400° F. or above, depending upon the method of polymerization used. Instead of taking the pressure distillate from storage, it may be passed directly from a cracking plant (not shown) at a temperature as indicated above, through line 13, connecting with pipe 14 leading to the polymerizing chamber 15. The heated pressure distillate may be subjected to polymerization by any suitable known method, typically and preferably by passing the distillate through a body of adsorptive material, such as fuller's earth or Muroc clay, contained within the chamber 15.

The purpose of subjecting the pressure distillate to polymerization is to remove the gum-forming constituents of the oil, and to place the gum-forming and sulphur-containing compounds in a condition whereby they are rendered removable by the heavier oil admixed with the distillate. This heavier solvent oil may consist of any suitable oil or petroleum fraction heavier than the gasoline fraction contained in the pressure distillate. Generally speaking, I prefer to use as the heavier solvent oil, fuel oil, or a crude oil containing in addition to gasoline, lower boiling fractions including fuel oil and heavier hydrocarbons.

Where the heavier oil is not otherwise heated, it may be discharged by pump 16 through a heater 17 wherein the oil is heated to a temperature that preferably is higher than the normal vaporizing temperature of at least the lighter gasoline fractions in the polymerized pressure distillate. By supplying additional heat to the admixed oils, as later described, the temperature of the oil leaving heater 17 may be as low as around 300° F., although it is preferred to heat the oil to a substantially higher temperature, ranging, for example, between 450° F. to 550° F. or higher. The heated solvent oil is discharged through line 18 into an enlarged chamber 19 wherein the oil is thoroughly admixed with the polymerized pressure distillate flowing to the mixer through line 20. In chamber 19, the two oils are thoroughly commingled, and permitted to remain over a period of time sufficient to permit maximum dissolution of the pressure distillate gum-forming and sulphur compounds in the heavier oil. The admixed oils are at the same time maintained under pressure sufficient to keep at least the major portion of the gasoline fractions in liquid phase. To effect maximum removal of gum-forming and sulphur compounds, it is ordinarily preferred to mix with the pressure distillate from two to four times its volume of the heated heavier oil.

The admixed oils are discharged through line 21 into a separating zone or fractionating column 22 wherein the fractions lighter than fuel oil, or lighter than any other predetermined base fraction heavier than gasoline, are vaporized and separated from the unvaporized residuum, which may be removed to storage through line 23. Valve 24 may be set to reduce the pressure of the admixed oils entering the fractionating column, to an extent sufficient to effect partial or complete vaporization of the lighter fractions by virtue of the pressure reduction and the heat contained in the oils. That is to say, the temperature of the heavier oil may be raised sufficiently in the heater 17 to supply the heat necessary for complete vaporization of the lighter fractions beyond the valve 24, or in the event of only partial vaporization beyond that point, further heat to complete the vaporization of the lighter fractions may be supplied by suitable means such as a heating coil 25 in the base of the fractionating column.

The vapors are passed from column 22 through line 26 into fractionating column 27 within which the vapors are subjected to partial condensation for the purpose of separating the entire gasoline fraction into a lighter vaporized portion leaving the fractionating column through a line 28, and a heavier condensed or liquid portion which, together with any heavier than gasoline fractions carried over from fractionating column 22, are removed through line 29. It is to be understood that the gasoline vapors may be subjected to fractional condensation to produce any desired number of condensed cuts or fractions to again be mixed with the heavier oil, although in the specific system illustrated, I have shown only a single fractionating stage in which the gasoline content of the oils is subjected to simple fractionation to produce a single lighter vaporized portion, and a single heavier cut.

The condensate taken from fractionating column 27 through line 29 is again admixed with the heated heavier oil, which may be supplied from any suitable source, for example, through line 30 connecting with the heater discharge line 18, the single heater 17 serving to preheat the heavier oil introduced in both mixers 19 and 31. The heavier oil to be admixed with the heavy gasoline fraction may, on the other hand, be taken from a source independent of the heavier oil supplied in mixer 19. Accordingly, I have shown an independent supply line 32 through which preheated heavier oil may be taken from a suitable source other than the supply for heater 17. It will be understood, therefore, that the so-called "heavier oil" used in the initial treatment of the polymerized pressure distillate in mixer 19, and later in the treatment of the heavier portion of the gasoline fraction in the mixer 31, may consist of oils derived from the same or independent sources, although in each instance the solvent oil will have a boiling range substantially higher than the boiling range of the heaviest gasoline fractions being treated.

The heavier portion of the gasoline fraction withdrawn from column 27 through line 29 preferably is again heated to suitable polymerizing temperature, say in the neighborhood of from 300° F. to 375° F., by passage through the heater 33. The oil is then again subjected to polymerization by any suitable method, as by passing the oil while for the most part in liquid phase, through chamber 34 and in direct contact with adsorptive clay contained therein. Where the temperature of the oil leaving the fractionating column 27 is sufficiently high for purposes of polymerization, the heater 33 may be by-passed by discharging the oil directly through line 29a to the polymerizing chamber.

The polymerized heavy portion of the gasoline flowing through line 35, together with solvent oil from either of lines 30 or 32, is forced by pump 36 into the mixer 31 wherein the oils are intimately commingled, as previously explained with reference to the mixer 19. As before, the proportion of the heavier oil introduced to the mixer is substantially larger than the gasoline fraction, and during the mixing the oils are maintained under pressure such that the major portion of the gasoline will remain in liquid phase. From the mixer, the oils are discharged through line 37 into fractionating column 38, valve 39 being set to reduce the pressure of the oils so that the gasoline fraction will vaporize by virtue of the pressure reduction. Additional heat may be supplied by the heating coil 40 to completely vaporize the gasoline, where the heat content of the admixed oils and the pressure reduction at valve 39 are in themselves insufficient to produce flash vaporization of the entire gasoline content of the admixed oils.

The unvaporized oil in the base of fractionating column 38, which may consist of kerosene distillate or perhaps other heavier hydrocarbons depending upon the point of fractionation in column 22, together with the unvaporized heavy oil introduced to the mixer 31, is removed to storage through line 41. The vaporized heavier portion of the pressure distillate gasoline fraction may be separately condensed, or combined with the vaporized lighter portion of the gasoline fraction leaving the fractionating column 27. As illustrated, this vaporized lighter fraction may be taken separately from line 28 through line 42 to the condenser 43, or it may be discharged through line 44, combined with the vaporized heavy gasoline fraction leaving column 38 through line 38a, and both fractions then passed through line 45 to the condenser 46 and the distillate receiver 47. On the other hand, where the lighter gasoline fraction is separately condensed in condenser 43, the heavier vaporized fraction leaving column 38 may be separately subjected to further fractionation and condensation by discharging the vapors through line 48 into fractionating column 49, then passing the vapor fraction through lines 50 and 45 to the condenser 46. Condensate is removed from the base of fractionating column 49 to storage through line 51. As a further alternate method of operation, the vaporized lighter gasoline fraction in line 44 may be combined with the vaporized heavier fraction leaving fractionating column 38 (by closing valve 51 and opening valves 52 and 53), and both vapor fractions then subjected to fractionation in column 49 and final condensation in the condenser 46.

The form of the invention shown in Fig. 2 is similar to the previously described system in its treatment of the oils and vapors up to the vapor line 26, and therefore need not again be described beyond the application of the same reference numerals to corresponding parts. The system shown in Fig. 2 differs principally from that of Fig. 1 in that the clay treated vapors after leaving fractionating column 22 and being passed through clay chamber 127 to remove impurities, flow through line 128 to the fractionating column 144 wherein the vapors are fractionally condensed to separate the lighter and heavier portions of the gasoline fraction, and to separate said heavier portion from lower boiling heavy ends. The heavier portion of the gasoline fraction, instead of being separately mixed with the heavier solvent oil, is returned to the polymerizing chamber 15 and to the mixer 19.

The vapors from line 128 are discharged into a lower section 144a of the fractionating column 144, in which the entire gasoline fraction is separated from the hydrocarbons heavier than gasoline by condensation of the latter, the distillate being removed to storage through line 145. Any additional heat necessary for the fractionation may be supplied by heating coil 146 in the base of the fractionating column. The vaporized gasoline fraction passes upwardly through riser 147 and the imperforate plate 148 into the upper section 144b of the fractionating column, wherein a heavier portion of the gasoline fraction is condensed, leaving the vaporized lighter portion to flow through line 149 to condenser 150 and the distillate to receiver 15. Half or any other suitable fraction of the condensed heavier portion of the gasoline may be removed through line 152 to the receiver 15, while the condensate remaining is returned through lines 153 and 154 to be recirculated directly to and through the polymerizing chamber 15, or, via line 155, to the heater 11 and then through the polymerizing chamber. The recirculated fraction is again polymerized and thus combined with the polymerized pressure distillate flowing through line 20 to the mixer.

In both described forms of the invention, the entire gasoline fraction contained in the polymerized pressure distillate first is admixed with the heavier oil, then vaporized, leaving gum-forming and sulphur-containing compounds in the heavier oil. Thereafter, a heavier portion of the gasoline fraction containing sulphur compounds in higher percentage than the lighter portion of the gasoline fraction, is again subjected to polymerization and admixed with the heavier oil for further removal of the undesirable and contaminating bodies. It will be understood that the lighter and heavier portions of the gasoline fractions referred to in the foregoing, may include gasoline cuts within any suitable or predetermined boiling range. The particular point of fractionation may depend upon the sulphur content of relatively lighter and heavier portions of the pressure distillate gasoline, as determined by fractionation and sulphur analysis of the individual fractions. To give a typical example, the lighter fraction may consist of hydrocarbons boiling below 250° F., the heavier portion comprising the remainder of the gasoline range.

I claim:

1. The process of refining pressure distillate that includes, subjecting gasoline-containing heated cracked petroleum distillate to polymerization by contact with adsorptive material, heating heavier oil having a substantially higher boiling range than the gasoline content of said distillate, mixing the polymerized distillate with the heated heavier oil, vaporizing said gasoline from the heavier oil to leave part of the gum-forming and sulphur compounds of the gasoline in said heavier oil, separating a lower boiling fraction of the gasoline from a higher boiling fraction thereof, again polymerizing said higher boiling fraction of the gasoline by contact with adsorptive material and then mixing the polymerized fraction with heated heavier oil, vaporizing said higher boiling fraction from the last mentioned heavier oil, leaving additional gum-forming and sulphur-containing compounds in the heavier oil, and condensing the vaporized fractions of said gasoline.

2. The process of refining pressure distillate that includes, subjecting gasoline-containing heated cracked petroleum distillate to polymerization by contact with adsorptive material, heating heavier oil having a substantially higher boiling range than the gasoline content of said distillate to a temperature in excess of about 300° F., mixing the polymerized distillate with the heated heavier oil, vaporizing said gasoline from the heavier oil to leave part of the gum-forming and sulphur compounds of the gasoline in said heavier oil, separating a lower boiling fraction of the gasoline from a higher boiling fraction thereof, heating and polymerizing said higher boiling fraction of the gasoline by contact with adsorptive material and then mixing the polymerized fraction with heated heavier oil, vaporizing said higher boiling fraction from the last mentioned heavier oil, leaving additional gum-forming and sulphur-containing compounds in the heavier oil, and condensing the vaporized fractions of said gasoline.

3. The process of refining pressure distillate that includes, subjecting gasoline-containing heated cracked petroleum distillate to polymerization by contact with adsorptive material, heating heavier oil having a substantially higher boiling range than the gasoline content of said distillate, mixing the polymerized distillate with the heated heavier oil, further heating the mixed oils and vaporizing said gasoline from the heavier oil to leave part of the gum-forming and sulphur compounds of the gasoline in said heavier oil, separating a lower boiling fraction of the gasoline from a higher boiling fraction thereof, polymerizing said higher boiling fraction of the gasoline by contact with adsorptive material and then mixing the polymerized fraction with heated heavier oil, vaporizing said higher boiling fraction from the last mentioned heavier oil, leaving additional gum-forming and sulphur-containing compounds in the heavier oil, and condensing the vaporized fractions of said gasoline.

4. The process of refining pressure distillate that includes, subjecting gasoline-containing heated cracked petroleum distillate to polymerization by passing the distillate through a stationary body of adsorptive material, heating heavier oil having a substantially higher boiling range than the gasoline content of said distillate, mixing the polymerized distillate with the heated heavier oil, vaporizing said gasoline from the heavier oil to leave part of the gum-forming and sulphur compounds of the gasoline in said heavier oil, separating a lower boiling fraction of the gasoline from a higher boiling fraction thereof, polymerizing said higher boiling fraction of the gasoline by contact with adsorptive material and then mixing the polymerized fraction with heated heavier oil, vaporizing said higher boiling fraction from the last mentioned heavier oil, leaving additional gum-forming and sulphur-containing compounds in the heavier oil, and condensing the vaporized fractions of said gasoline.

5. The process of refining pressure distillate that includes, subjecting gasoline-containing heated cracked petroleum distillate to polymerization by contact with adsorptive material, heating heavier oil having a substantially higher boiling range than the gasoline content of said distillate, mixing the polymerized distillate with one stream of the heated heavier oil, passing the mixed oils into a separating zone and vaporizing said gasoline from the heavier oil admixed therewith to leave part of the gum-forming and sulphur compounds of the gasoline in said heavier oil, removing the heavier oil from the separating zone, separating a vaporized lower boiling fraction of said gasoline from an unvaporized higher boiling fraction thereof, polymerizing said higher boiling fraction of the gasoline by contact with adsorptive material and then mixing the polymerized higher boiling fraction with another stream of said heated heavier oil separate from the first mentioned stream of heavier oil, vaporizing said higher boiling fraction of the gasoline from the heavier oil admixed therewith, leaving additional gum-forming and sulphur-containing compounds in the heavier oil, and condensing the vaporized fractions of said gasoline.

6. The process of refining pressure distillate that includes, subjecting gasoline-containing heated cracked petroleum distillate to polymerization by contacting it with adsorptive material, heating a heavier oil having a substantially higher boiling range than the gasoline content of said distillate, mixing the polymerized distillate with the heated heavier oil, passing the mixed oils into a separating zone and vaporizing said gasoline from said heavier oil to leave part of the gum-forming and sulphur compounds of the gasoline in said heavier oil, removing the heavier oil from the separating zone, separating a vaporized lower boiling fraction of said gasoline from an unvaporized higher boiling fraction thereof, heating and polymerizing said higher boiling fraction by contacting it with adsorptive material, then mixing said higher boiling fraction with heated heavier oil, vaporizing said higher boiling fraction from the heavier oil admixed therewith in a second separating zone to leave additional gum-forming and sulphur-containing compounds in the heavier oil, withdrawing the unvaporized heavier oil from said second separating zone, and condensing the vaporized fractions of said gasoline.

7. The process of refining pressure distillate that includes, subjecting gasoline-containing heated cracked petroleum distillate to polymerization by contacting it with adsorptive material, heating heavier oil having a substantially higher boiling range than the gasoline content of said distillate, mixing the polymerized distillate with the heated heavier oil, passing the mixed oils into a separating zone and vaporizing said gasoline from said heavier oil to leave part of the gum-forming and sulphur compounds of the gasoline in said heavier oil, passing the vaporized gasoline through a body of adsorptive material, removing the heavier oil from the separating zone, separating a vaporized lower boiling fraction of said gasoline from an unvaporized higher boiling fraction thereof, polymerizing said higher boiling fraction by contacting it with adsorptive clay and then mixing said higher boiling fraction with said heated heavier oil, vaporizing said higher boiling fraction from the heavier oil admixed therewith, leaving additional gum-forming and sulphur-containing compounds in the heavier oil, and condensing the vaporized fractions of said gasoline.

8. The process of refining pressure distillate that includes, subjecting gasoline-containing heated cracked petroleum distillate to polymerization by passing it through a treating zone containing adsorptive material, heating heavier oil having a substantially higher boiling range than the gasoline content of said distillate, mixing the polymerized distillate with the heated heavier oil, passing the mixed oils into a separating zone wherein said gasoline is vaporized from said heavier oil to leave part of the gum-forming and sulphur compounds of the gasoline in said heavier oil, removing the heavier oil from the separating zone, separating a vaporized lower boiling fraction of said gasoline from an unvaporized higher boiling fraction thereof, further depleting said higher boiling fraction of the gasoline of its gum-forming and sulphur compounds by returning it to said treating zone wherein it is again polymerized together with the pressure distillate passing therethrough and later vaporized from said heavier oil, and finally condensing the vaporized fractions of said gasoline.

9. The process of refining pressure distillate that includes, subjecting gasoline-containing heated cracked petroleum distillate to polymerization by contacting the distillate in a treating zone with adsorptive material while heated to a temperature in excess of about 200° F. but below the temperature of cracking, heating heavier oil having a substantially higher boiling range than the gasoline content of said distillate to a temperature of at least about 300° F., mixing the polymerized distillate with a larger quantity of the heated heavier oil to leave part of the gum-forming and sulphur compounds of the gasoline in said heavier oil, vaporizing said gasoline from the heavier oil, condensing a lower boiling fraction of the gasoline from the vapors, further depleting said lower boiling fraction of its gum-forming and sulphur compounds by returning it to said treating zone wherein it is again subjected to polymerization together with the pressure distillate flowing therethrough and later vaporized from said heavier oil, and finally condensing vaporized fractions of said gasoline.

10. The process of refining pressure distillate that includes, subjecting gasoline-containing heated cracked petroleum distillate to polymerization by contacting the distillate with adsorptive material while heated to a temperature in excess of about 200° F. but below the temperature of cracking, heating heavier oil having a substantially higher boiling range than the gasoline content of said distillate to a temperature of at least about 300° F., mixing the polymerized distillate with a larger quantity of the heated heavier oil, passing the mixed oils into a separating zone and vaporizing said gasoline from at least a portion of said heavier oil to leave part of the gum-forming and sulphur compounds of the gasoline in said heavier oil, removing said portion of the heavier oil from the separating zone, separating a vaporized higher boiling fraction of said gasoline from an unvaporized lower boiling fraction thereof, heating said lower boiling fraction and contacting it with adsorptive material, then mixing said higher boiling fraction with a larger quantity of heated heavier oil, vaporizing said higher boiling fraction of the gasoline from the heavier oil admixed therewith, leaving additional gum-forming and sulphur-containing compounds in the heavier oil, and finally condensing vaporized fractions of said gasoline.

11. The process of refining pressure distillate that includes, subjecting gasoline-containing heated cracked petroleum distillate to polymerization by contacting the distillate with adsorptive material while heated to a temperature in excess of about 200° F. but below the temperature of cracking, heating heavier oil having a substantially higher boiling range than the gasoline content of said distillate to a temperature of at least about 300° F., mixing the polymerized distillate with a larger quantity of the heated heavier oil, reducing the pressure of the mixed oils and passing them into a separating zone wherein said gasoline is vaporized from said heavier oil to leave part of the gum-forming and sulphur compounds of the gasoline in said heavier oil, removing the heavier oil from the separating zone, separating a lower boiling fraction of said gasoline from an unvaporized higher boiling fraction thereof, heating and contacting said higher boiling fraction of the gasoline with adsorptive material and then mixing said higher boiling fraction with heated heavier oil, vaporizing said higher boiling gasoline fraction from the heavier oil admixed therewith in a second separating zone and leaving additional gum-forming and sulphur compounds in the last mentioned heavier oil, withdrawing the unvaporized heavier oil from said second separating zone, and finally condensing the vaporized fractions of said gasoline.

WILLIAM T. HANCOCK.